F. J. SCHISLER.
POULTRY DRINKING FOUNTAIN.
APPLICATION FILED MAY 4, 1912.
1,062,609.
Patented May 27, 1913.
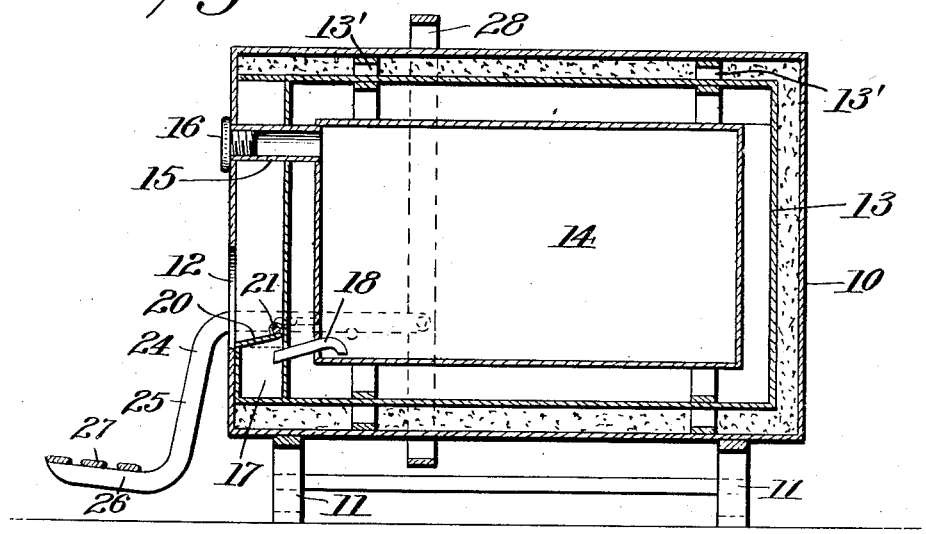
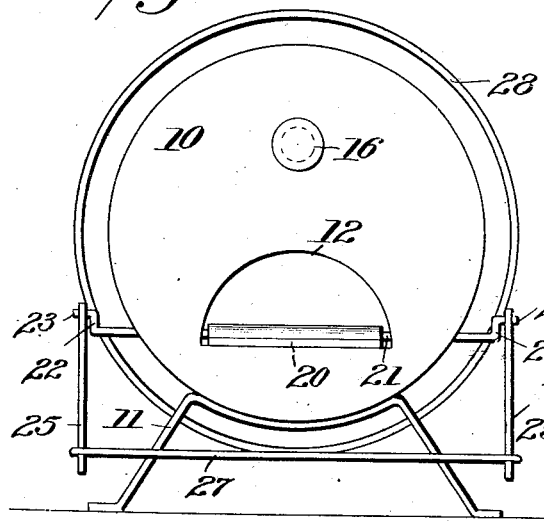
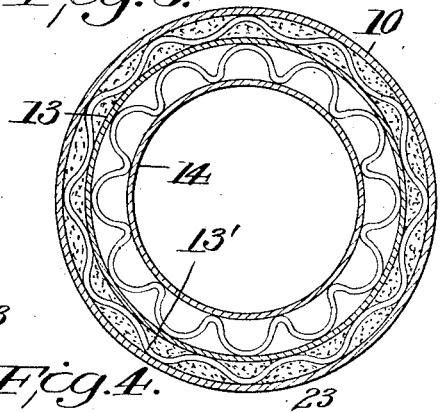
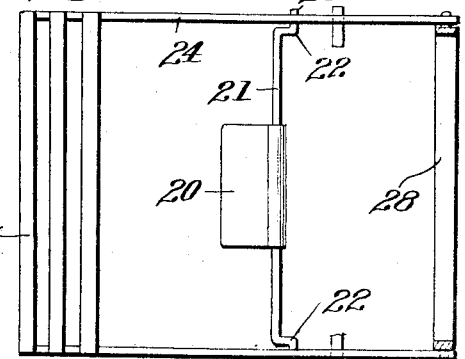
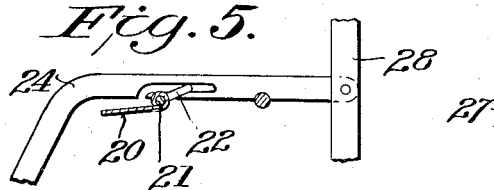
WITNESSES

UNITED STATES PATENT OFFICE.

FRANK J. SCHISLER, OF WINTHROP, MINNESOTA.

POULTRY DRINKING-FOUNTAIN.

1,062,609. Specification of Letters Patent. Patented May 27, 1913.

Application filed May 4, 1912. Serial No. 695,255.

To all whom it may concern:

Be it known that I, FRANK J. SCHISLER, a citizen of the United States, residing at Winthrop, in the county of Sibley and State of Minnesota, have invented new and useful Improvements in Poultry Drinking-Fountains, of which the following is a specification.

This invention relates to certain new and useful improvements in poultry drinking fountains.

The invention has for its object the provision of a drinking fountain of the character referred to in which the water is protected from contamination at all times.

A further object is to provide means for keeping the water chamber normally covered and providing for the automatic uncovering thereof when the poultry approach the same to obtain water.

A further object is to provide means for maintaining the water within the fountain at a low temperature in hot weather, and also preventing freezing of the water in cold weather, and also for automatically maintaining a supply of drinking water in a protected trough at all times and in a position which is readily accessible.

The invention will be hereinafter fully set forth and particularly pointed out in the claims.

In the accompanying drawing:—Figure 1 is a longitudinal sectional view of the poultry drinking fountain constructed in accordance with my invention. Fig. 2 is a front end view thereof. Fig. 3 is a transverse sectional view of Fig. 1. Figs. 4 and 5 are detail views illustrating the cover operating device. Fig. 6 is a detail view of a slight modification.

Referring to the drawings, 10 designates an inclosing casing preferably formed of sheet metal and of any desired shape, the same being supported upon legs or standards 11 and provided with an opening 12 at its forward end. Located within said casing 10 and spaced therefrom is an insulating casing 13, supported by rings 13′ of corrugated material; and located inside of the insulating casing 12 is a reservoir 14 which is similarly supported. A filling tube 15 extends through the front end walls of the casings 10 and 12 to the reservoir 14, said tube being closed by a screw cap 16. Located in the space between the forward ends of casings 10 and 12 is a trough 17 which is fed by a supply tube 18 extending into the reservoir 14, the space between casings 10 and 12 is filled by a suitable insulating material.

The trough 17 is normally closed by a cover 20 which is secured in any suitable manner to a rod 21, pivotally mounted in casings 10 and 12, said rod being provided with crank arms 22 having lateral pins 23. Pivotally supported arms 24 are arranged on opposite sides of casing 10, the forward ends of said arms engaging the pins 23. Rigidly secured to the forward ends of arms 24 are depending members 25 provided with forward extensions 26 which are connected by a platform 27 upon which the poultry may stand. The rear ends of arms 24 are weighted in any suitable manner, as by a ring 28 encircling casing 10 and connected to said rear ends. Said ring in addition to its counterbalancing functions also limits the pivotal movement of the platform 27. In lieu of ring 28 arms 24 may be provided with weights 29, as illustrated in Fig. 6.

In practice it will be noted that the weight of ring 28 is sufficient to counterbalance the weight of the platform 30 and its adjuncts, and also to hold the cover 20 normally closed. When a fowl desires to drink it cannot approach the fountain without standing upon the platform 30 whereupon the forward end of the arms 24 are depressed effecting the lifting of the cover 20. As long as the fowl stands on the platform the cover will remain open, but immediately that its weight is removed from the platform, the weight of ring 28 asserts itself and the cover is instantly and automatically closed. As the water is consumed from the trough 17 a new supply will enter through the pipe 18, thereby maintaining a uniform quantity in said trough. Thus it will be seen that a constant supply of fresh water is maintained and that the water is at all times protected from pollution. The latter result is secured in two ways, namely the trough 17 is located inside of the casing 10 in a position where the poultry cannot perch upon it, and where access can be had only by inserting their heads through the opening 12; and further because the cover 20 is instantly closed as soon as the weight of the fowl is removed from the platform 30. By placing the reservoir within an insulating casing which is in turn located within an exterior casing, I provide means for maintaining the water at a low temperature in hot weather, and also for preventing freezing of the water in cold weather. It will be particularly noted that the arms 24 are notched to receive their pivots, thus permitting said arms and platform to be readily removed for cleansing or the like.

Having thus explained the nature of my invention and described an operative manner of constructing and using the same, although without attempting to set forth all of the forms in which it may be made, or all of the forms of its use, what I claim is—

1. A poultry drinking fountain comprising a casing, a reservoir within the casing, a trough also within the casing, and in communication with said reservoir, a cover for said trough, a pivot rod for said cover, arms pivoted to the exterior of said casing and engaging said rods, said arms being provided with a platform at one end the other ends of said arms being weighted to hold said cover normally closed.

2. A poultry drinking fountain comprising a casing, a reservoir within the casing, a trough also within the casing and in communication with said reservoir, a cover for said trough, a pivot rod for said cover provided with crank arms at its ends, arms pivoted to the exterior of said casing and engaging said crank arms, said arms being provided at their forward ends with a platform, the rear ends of said arms being weighted to hold said cover normally closed.

3. A poultry drinking fountain comprising a casing, a reservoir within the casing, a trough also within the casing and in communication with said reservoir, arms pivoted to the exterior of said casing, and means for providing a removable engagement between said arms and cover, the forward ends of said arms being provided with a platform, the other ends of said arms being weighted to hold said cover normally closed.

4. A poultry drinking fountain comprising a casing, a reservoir within the casing, a trough also within the casing and in communication with said reservoir, and arms pivoted to the exterior of said casing and having open ended slots to receive the ends of said pivot rod, the forward ends of said arms being provided with a platform, the other ends of said arms being weighted to hold said cover normally closed.

5. A poultry drinking fountain comprising a casing, a reservoir within the casing, a trough also within the casing and in communication with said reservoir, a cover for said trough, a pivot rod for said cover, arms pivoted to the exterior of said casing and engaging said rod, the forward ends of said arms being provided with a platform, and a ring encircling said casing and connected with the rear ends of said arms.

In testimony whereof I have hereunto set my hand in presence of two subscribing witnesses.

FRANK J. SCHISLER.

Witnesses:
Wm. F. Hodges,
M. E. Smith.